United States Patent [19]
de Maight

[11] 4,204,584
[45] May 27, 1980

[54] FLUID SUPPLY SYSTEM FOR AUXILIARY POWER STEERING HAVING PRESSURE STORAGE MEANS

[75] Inventor: Winfried de Maight, Mutlange, Fed. Rep. of Germany

[73] Assignee: Zahnradfabrik Friedrichshafen, AG., Friedrichshafen, Fed. Rep. of Germany

[21] Appl. No.: 941,751

[22] Filed: Sep. 13, 1978

[30] Foreign Application Priority Data

Sep. 22, 1977 [DE] Fed. Rep. of Germany ....... 2742688

[51] Int. Cl.² .............................................. B62D 5/06
[52] U.S. Cl. ...................................... 180/133; 60/413
[58] Field of Search .................. 180/133, 132; 60/418, 60/413, 404

[56] References Cited

U.S. PATENT DOCUMENTS

| | | | |
|---|---|---|---|
| 3,841,095 | 10/1974 | Baker ..................................... | 60/413 |
| 3,882,952 | 5/1975 | Crabb ................................. | 60/404 X |
| 3,964,260 | 6/1976 | Williams et al. .................... | 60/418 X |

*Primary Examiner*—John A. Pekar
*Attorney, Agent, or Firm*—Zalkind & Shuster

[57] ABSTRACT

A pump having a limited maximum output pressure is alternately connected to a steering control valve and a pressure storage reservoir charged by the pump under control of a signal pressure operated valve to supply fluid under the maximum pump pressure to a steering servomotor only under high loading conditions. The storage pressure is limited to a value less than the maximum pump pressure to influence operation of the signal pressure operated valve and operate the servomotor under low load conditions.

6 Claims, 1 Drawing Figure

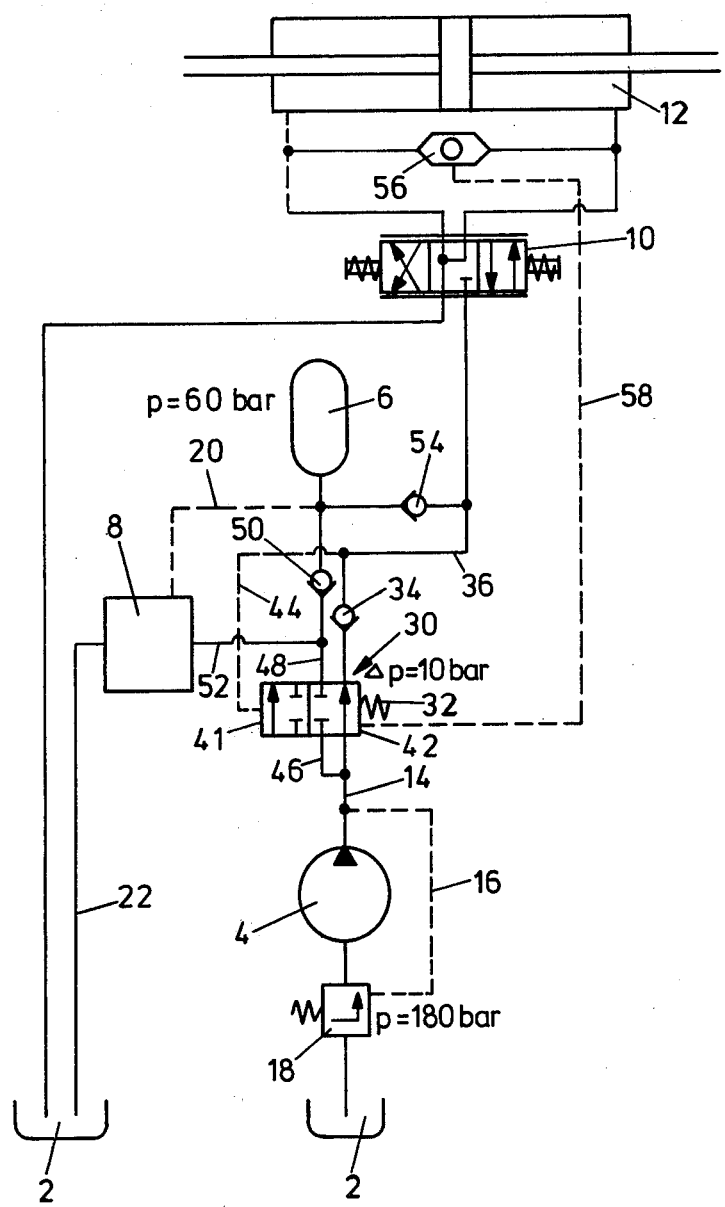

FLUID SUPPLY SYSTEM FOR AUXILIARY POWER STEERING HAVING PRESSURE STORAGE MEANS

BACKGROUND OF THE INVENTION

The present invention relates to a hydraulic auxiliary power steering system for vehicles, especially heavy motor vehicles but also for marine craft.

Hydraulic auxiliary power steering systems generally have a mechanical connection between a manual actuating mechanism such as a steering wheel and the steered parts of the vehicle or a rudder in the case of a marine craft. Additionally, hydraulic auxiliary power amplification to facilitate steering is provided. One type of such power steering system is equipped with a pressure storage reservoir. The pressure storage reservoir is ordinarily arranged to meet a high fluid operating pressure demand since substantial steering forces are required for the steering of heavy vehicles at standstill and at low speeds. For speeds below 5 km/h, pressures up to 180 BAR are required for generating these forces. Reservoirs arranged to store such pressure with reliability are relatively massive and expensive.

At higher speeds, only relatively low pressures of up to 5 BAR for example, are required for steering purposes. When the servomotor is then operated through the steering control valve from the storage reservoir charged to a pressure of 180 BAR, the 5 BAR pressure needed for operation of the servomotor is exceeded by 175 BAR resulting in a drop in pressure primarily across the steering control valve. Accordingly, relatively high leakage losses and power losses occur. This problem may be particularly dealt with by providing the steering control valve with very small clearances and finishing tolerances attainable only by very expensive finishing procedures. The high cost involved in such finishing procedures is not, however, warranted because steering activity during standstill and low speeds of travel including parking, represents only about 1% of the total time of steering activity.

SUMMARY OF THE INVENTION

In accordance with the present invention, a hydraulic auxiliary power steering system of the type in which the fluid power supply includes a pressure storage reservoir, is provided whereby manufacturing economies are possible with respect to both the storage reservoir and the steering control valve. Such manufacturing economies are achieved by limiting the storage pressure to a value less than the maximum operating pressure from the high pressure pump alternatively connected by a fluid pressure operated valve directly to the steering control valve and the storage reservoir for charging thereof. The pressure storage reservoir therefore does not store the maximum required operating pressure of 180 BAR, but rather a lower pressure of 60 BAR by way of example. By means of the pressure operated valve, the servomotor under low load conditions is supplied through the steering control valve with pressure fluid from the storage reservoir but during high load steering conditions receives pressure fluid directly from the high pressure pump from which the maximum required operating pressure of 180 BAR is available. The pressure operated valve assembly furthermore controls charging of the pressure storage reservoir.

As a result of the present invention, a smaller capacity and less costly pressure storage reservoir may be used for storing fluid under a lower than maximum operating pressure. Also, a less costly steering control valve may be used because of the lower manufacturing precision necessary to handle lower pressures.

It has been determined that during 99% of the steering activity time, the steering control valve receives its pressure fluid from the storage reservoir. Consequently, lower pressure drops and smaller leakage and power losses occur. During the remaining 1% of the steering activity time, the steering control valve is directly fed from the high pressure pump to supply the servomotor with fluid under a higher pressure so that only a relatively small drop in pressure at the steering valve again occurs. A reduced output of energy from the high pressure pump is thus required under standard operating conditions for charging the storage reservoir as compared to the output energy otherwise required to constantly produce the maximum operating pressure. Wear of the high pressure pump is thereby reduced as well as to effect a reduction in power consumption.

In accordance with another aspect of the invention, the pressure operated valve in its rest or pump pressure position connects the high pressure pump to the steering control valve so that pressure is available for the servomotor as soon as the engine is started. Further, even before the operating reservoir storage pressure is attained, the pressure operated valve connects the steering control valve directly to the high pressure pump so that there will always be sufficient reserve power for steering under high loading conditions.

BRIEF DESCRIPTION OF THE DRAWING FIGURE

The drawing consists of a fluid circuit diagram depicting one embodiment of a hydraulic auxiliary power steering and fluid supply system in accordance with the present invention.

DETAILED DESCRIPTION OF PREFERRED EMBODIMENTS

The system depicted in the drawing includes a reservoir tank 2 for operating fluid, a high pressure pump 4, a pressure storage reservoir or accumulator 6 with which a charge valve 8 is associated, a steering control valve 10 and a servomotor 12 which operates the steered parts of a vehicle. The high pressure pump 4 delivers fluid to a high pressure line 14 which communicates through a feedback line 16 with an actuating surface of a relief jet valve 18 by means of which the discharge pressure of the high pressure pump 4 is limited to about 180 BAR, for example. The pressure storage reservoir 6 communicates through line 20 with an operating surface of the charge valve 8 of a well known type such as a relief jet valve. The charge valve opens whenever the maximum permissible storage pressure of 60 BAR, for example, is exceeded. Upon opening of the charge valve, pressure fluid from the high pressure pump 4 exhausts through line 22 to the tank 2. The steering control valve 10 has a flow-blocking center position and controls the supply of pressure fluid to one or the other of the operating chambers associated with the servomotor 12, depending on steering displacement of the valve from its center position. The fluid circuit so far described is generally known in the art.

In accordance with the present invention, a signal pressure operated valve assembly 30 which may be in the form of an axial piston valve, is held in a rest or pump pressure position as shown, under the adjustable bias of a spring 32. In this position the valve connects the high pressure line 14 through a check valve 34 and a supply line 36 to the steering control valve 10 and the servomotor 12 is directly supplied with fluid from the high pressure pump 4 for high load steering purposes.

The signal pressure operating means for the valve assembly 30 includes a first actuating surface 41 and a second opposing actuating surface 42 to which an actuating force is applied in the same direction as the bias exerted by spring 32. The supply line 36 is connected to the first actuating surface 41 through a pressure feedback line 44. Consequently, the valve assembly 30 is displaced from the pump pressure position shown to a normal storage pressure position as soon as the high pressure pump 4 has built up a pressure of 10 BAR, for example, to overcome the force of the spring 32.

Assuming that no steering action takes place, the steering valve 10 remains in the central position shown blocking flow through line 36 to the servomotor. With the valve assembly 30 displaced to its storage pressure position, the storage reservoir 6 is charged through lines 46 and 48 and a check valve 50 to the maximum storage pressure at which point excess pressure fluid is exhausted through line 52, the charge valve 8 and line 22 to tank 2. The storage reservoir 6 is also connected by a check valve 54 and line 36 to the steering control valve 10 when the direct connection from the high pressure pump 4 to line 36 is interrupted by valve assembly 30 under low load steering conditions.

The two operating chambers of the servomotor 12 are connected with two inflow chambers of a comparator shuttle valve assembly 56 formed by check valves arranged in opposing flow-blocking relation to each other as is well known in the art. The intermediate space between the check valves of the comparator valve assembly is connected by a line 58 to the second actuating surface 42 of the valve assembly 30. Whenever one of the operating chambers of the servomotor 12, functioning as a surge chamber, is pressurized and its pressure approaches the storage pressure of reservoir 6, the pressure acting on the actuating surface 42 rises to such a value that the force exerted thereby on the piston of valve assembly 30 together with the force of spring 32 exceeds the force exerted on surface 41 under the influence of the storage reservoir pressure. The valve assembly 30 therefore returns to the pump pressure position shown in the drawing, to operate the servomotor 12 directly from the high pressure pump 4 and produce a high steering force.

Since the force of the spring 32 is added to the force exerted by the fluid pressure in line 58 on the piston of valve assembly 30, the valve assembly is displaced to the pump pressure position shown establishing the direct connection between the high pressure pump and the steering control valve before the storage operating pressure is attained. Further, the spring 32 in the idle condition of the vehicle engine driving the high pressure pump, also establishes the same direct connection.

What is claimed is:

1. An auxiliary power steering system for a vehicle having a reservoir (2) for operating fluid, a pressure storage device (6) pressurized by a high pressure pump (4), a steering control valve (10), and a servomotor (12) connected between said control valve and the reservoir for operation under a maximum operating pressure, the improvement comprising means (8) connected to the reservoir for limiting pressurization of the pressure storage device to a storage pressure less than said maximum operating pressure, a valve assembly (30) alternatively connecting the high pressure pump to the storage reservoir and the steering control valve, having opposed actuating surfaces (41 and 42), conduit means (36-44) connected between the valve assembly and the steering control valve for supply of fluid under operating pressure exerting a force on one of the actuating surfaces (41) of the valve assembly, and means (58) connecting the servomotor to the other of the actuating surfaces (42) for supply of fluid under the operating pressure in the servomotor exerting an actuating force displacing the valve assembly from a pump pressure position to a storage pressure position connecting the high pressure pump to the pressure storage device as long as the operating pressure in the servomotor is less than the storage pressure, said valve assembly being connected to the steering control valve whenever the operating pressure in the servomotor is greater than the storage pressure.

2. The auxiliary power steering system as defined in claim 1, including means (32) for exerting a bias on the valve assembly in the same sense as the force exerted on the other of the actuating surfaces (42), whereby the valve assembly connects the high pressure pump to the steering control valve both in the pump pressure position and whenever the operating pressure exceeds the differential between said bias and the storage pressure.

3. The auxiliary power steering system as defined in claim 1 or 2, including shuttle valve means (56) connected to the servomotor for pressurizing said other of the actuating surfaces (42) of the valve assembly to exert said actuating force thereon.

4. In combination with an auxiliary fluid power steering system having a pump (4) from which a maximum operating pressure is obtained, pressure storage means (6) charged by said pump, a servomotor (12), and a steering control valve (10) connecting the pressure storage means to the servomotor, means (8) limiting pressurization of the pressure storage means to a storage pressure less than the maximum operating pressure of the pump for operation of the servomotor under relatively low loading conditions, pressure operated valve means having two operative positions (30) for connecting the pump to the pressure storage means in response to pump operating pressure when the steering control valve blocks flow to the servomotor, means (58) responsive to operation of the servomotor under relatively high loading conditions for displacing the pressure operated valve means to one of said operative positions, and conduit means (36) operative in said one of the operative positions of the valve means for supplying the servomotor with fluid from the pump under said maximum operating pressure.

5. The combination of claim 4 including spring means (32) for biasing the valve means to said one of the operative positions in opposition to the pump operating pressure.

6. In combination with a continuously operating pump (4) supplying pressurized fluid, a fluid pressure operated device (12) having low and high load conditions, a pressure storing accumulator (6), a pump control valve (30) displaceable between operative positions alternatively connecting the pump to the operated device and to the accumulator, the improvement residing in valve actuating means (36-41, 58-42) operatively connected to the control valve for displacement thereof from one of said operative positions to the other of the operative positions in response to said low load condition of the operated device, and means (54) conducting fluid under pressure from the accumulator to the operated device for operation thereof only under said low load conditions.

* * * * *